2,730,051
BREAD DOUGH LOAF CURLING
Francis Frederick Hansen, Pittsburgh, Pa.

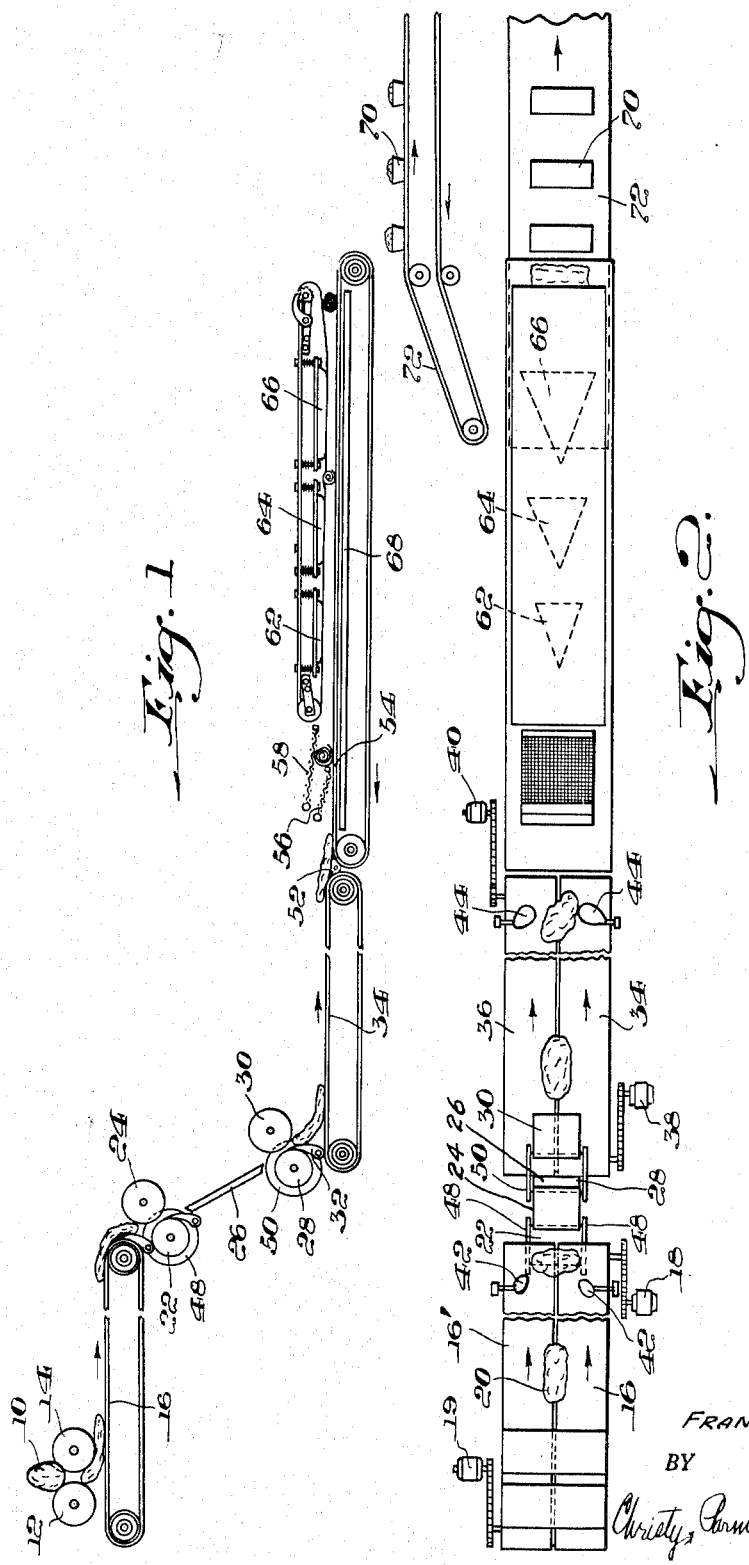

Application May 23, 1952, Serial No. 289,583

2 Claims. (Cl. 107—54)

This invention relates to bread dough loaf moulding. More particularly the invention relates to the moulding of bread dough wherein lumps of bread dough of proper size for making a loaf of bread are sheeted into elongated strips and then curled transversely of the longitudinal axis of the strip to form the bread loaves.

The principal function of the bread dough loaf moulding operation is to knead the dough to expel the gas ($CO_2$) from the dough and to develop the proper grain and texture in the loaf. To accomplish this it is important to have the moisture uniformly distributed throughout the loaf and to have the loaf rolled into a substantially uniform cross-sectional area from end to end.

The present invention is a continuation-in-part of my invention illustrated and described in my application Serial No. 263,572, filed December 27, 1951. According to the invention of application Serial No. 263,572, lumps of bread dough are cross-sheeted into thin sheets and then curled to loaves while moving in a unidirectional path. In my copending application Serial No. 287,757, filed May 14, 1952, lumps of bread dough are sheeted, then the sheet is shifted 90° and cross-sheeted transversely of the strip to modify the grain and texture and obtain a uniform distribution of the moisture in the sheet. The cross-sheeted strip is then curled while moving in the direction which passes through the cross-sheeting rolls. Reference is hereby made to said applications Serial Nos. 263,572 and 287,757 for a detail description of the apparatus for carrying out such methods.

In the method more particularly defined in application Serial No. 287,757, the sheeted dough strip is shifted 90° before being cross-sheeted, then cross-sheeted and immediately passed under the curling screen and pressure rolled. The sheeting rolls may be constructed to make the thin strip approximately round and having a diameter shorter than the length of the desired bread loaf to be put in a pan. Then the pressure rolling will bring the curled roll to a substantially uniform diameter throughout its length and a length to fill the desired pan.

I have now found that with long loaves of bread (14 to 20 inches in length) a superior loaf in shape and texture may be obtained if the cross-sheeted strip is made narrow and thin, with the length being slightly shorter than the finished length of the loaf as it is to enter the pan. Then the long strip is turned on a transfer belt to an angle of 90° to the longitudinal axis of the strip. Preferably the transfer belt is long for carrying out the turning operation so that the strip of dough has an opportunity to relax and contract before it is delivered to the curling chains by the pressure rolling belt at a lower elevation than the transfer belt, and by controlling the belt speeds, the dough strip may be moved continuously in a unidirectional path from one belt to the other. This places the dough strip in position for cross-curling, and puts the dough in better condition for curling.

The primary object of the present invention is to provide a method and apparatus for bread dough loaf moulding to make a loaf that is cross-sheeted and cross-curled.

Another object of the invention is to provide a method and apparatus for bread dough loaf moulding by which a cross-sheeted dough strip is allowed to relax prior to being curled and pressure-rolled.

A further object of the invention is to provide a method and apparatus for bread dough loaf moulding by which a cross-sheeted dough strip is turned through an angle of 90° to be cross-curled.

With these and other objects in view, the invention consists in the method and apparatus for cross-sheeting and cross-curling bread dough loaves as hereinafter described and particularly defined in the appended claims.

The various features of the invention are illustrated in the accompanying drawings, in which:

Fig. 1 is a diagrammatic view in elevation of an apparatus for carrying out the preferred method of this invention with certain guide elements omitted for clarity of illustration; and Fig. 2 is a diagrammatic plan view of the apparatus shown in Fig. 1.

In the present invention the mass of dough is weighed and lumps of dough suitable for making a loaf of bread are separated from the mass and fed in regular order through the moulding machine. The lump of dough 10 first passes between pre-sheeting rolls 12 and 14. The pre-sheeting rolls of the present invention are adjusted for carrying out a sheeting operation wherein the dough is kneaded, compressed and extruded to make a thin, elongated sheet. This elongated sheet is deposited on a belt 16 which is composed of two belts running in parallel with the dough-carrying surfaces of the two belts in the same plane. Belt 16' (Fig. 2) is driven by a motor 18 so as to move at a higher rate of speed than the belt 16 which is driven by a motor 19, and thus acts to turn the sheet of dough 20 deposited on the belt so that its longitudinal axis is substantially at right angles to the axis of the sheet as it emerges from the rolls 12 and 14 before it reaches the first set of sheeting rolls 22 and 24. As the sheet of dough passes between the rolls 22 and 24 it is further sheeted in a direction transverse to the first sheeting operation in the rolls 12 and 14, and then passes on to a transfer board 26 (Fig. 1). A further sheeting operation then is performed on the sheet of dough as it passes through a second set of sheeting rolls 28 and 30. The dough strip passing between the rolls 28 and 30 is removed by means of a doctor and deposited on a two-part belt 34 and 36 (Fig. 2). The belt 34—36 is operated to rotate or turn the dough strip a second time at an angle of 90° from the axis of the strip as it emerges from the rolls 28 and 30. This arrangement positions the dough strip for cross-curling or curling the dough strip about its transverse axis to form a roll of dough suitable to pass through the pressure rolls to form the dough for panning. The belt 34 is operated by a motor 38 through a chain and sprocket drive, and the belt 36 is operated by a motor 40 through a chain and sprockekt drive. The motor 40 is normally operated at a higher rate of speed than the motor 38 in order to turn the sheet of dough as it travels across the belt. At the end of the belts 16 and 16' and the belts 34 and 36 are positioned guides 42 and 44 respectively. The guides 42, which for clarity of illustration are shown only in Fig. 2, act to position the strips of dough for entering the rolls 22 and 24, while the guides 44 act to position the dough strips for passing on to a pressure-rolling belt 54. The roll 22 is provided with flanges 48 at each end between which the roll 24 fits, in order to control the width of the dough strip as it passes between the first set of sheeting rolls. The second set of sheeting rolls also has a flange 50 on each end of the roll 28 for controlling the width of the dough strip as it passes between the rolls.

With the construction outlined above, the width of the strip can be accurately controlled and the guides 42 will act to position the strip as it advances in a unidirectional path to accurately enter the rolls in order to control the shape of the dough strip. In accordance with the present invention, it is desired to have a strip in which the longitudinal axis is much greater in length than the transverse axis. This arrangement is preferred due to the fact that the dough strip is to be cross-curled and the length of the strip is slightly shorter than the length of the bread loaf to be made. After the dough passes through the two sets of sheeting rolls, the strip is turned before being curled, in order that the curling shall be about the transverse axis.

As the dough strip leaves the belt 34—36, it is transferred by means of a doctor 52 to a pressure-rolling belt 54. The length of the belts 34 and 36 is such that the dough strip will have an opportunity to relax and contract while it is moving from the rolls 28 and 30 to the belt 54. This arrangement places the dough in good condition for curling; it minimizes the air that is entrapped during the curling operation, and gives a better relaxation of the dough roll during the pressure-rolling operation. The dough strip is carried by the belt 54 first under curling chains 56 and 58 to be curled into a roll, and then passes under a pressure-rolling board 60 which is composed of triangular sections 62, 64, and 66. The triangular sections 62, 64 and 66 compress the dough against a board 68 under the belt 54 and act to elongate the roll to the desired length for fitting the pans in which the dough is to be baked. The guides 44 which, like the guides 42, are shown only in Fig. 2 position the dough strip so that when the curled roll enters under the pressure board, the pointed end of the sections 62, 64 and 66 will first meet substantially the center of the curled roll and elongate the dough from the center toward each end. In this rolling operation the air is removed from the roll and the division lines formed in rolling the sheet are eliminated while the cross-sectional area of the roll is reduced to a substantially uniform cross-section throughout the length of the roll. The elongation caused in the rolling is carefully controlled so that the roll will fit in the pans at the end of the rolling operation. The belt 68 delivers the dough into pans 70 which are presented in receiving position on a belt 72. The belt 72 and the belt 68 are synchronized so that a pan will be placed at the time that each roll emerges from the belt 68. The motors for driving the split belts 16—16' and 34—36 can be used for operating the sheeting rolls and the pressure-rolling belt 68. For this purpose sprocket chains can be used in accordance with the speed of the motors, to give the desired rate of rotation to the various parts.

From Fig. 1 it will be seen that the axis of the pulley upon which the belt 68 is carried adjacent the pulley on which the belts 34 and 36 are carried is at a lower level, so that when the dough strip passes from the split belt 34—36, it will move in a downward direction to pass upon the belt 54. Preferably the belt 68 will be run at a lower rate of speed than the belts 34—36 which deliver the strip to the belt 54, so that the belt 54 will receive the dough strip and carry it in a regular timed relation to the operation of the machine.

The dough from the time of entering the pre-sheeting rolls until it is deposited in the pans, moves in a unidirectional path and the lumps of dough are preferably deposited in the presheeting rolls at timed intervals so that the spacing of the dough loaves on the belts and in the rolls is controlled to have the entire moulding operation continuous without the requiring of handling of the various parts to deposit the moulded dough at regular intervals in the pans.

If desired, the sheeting operation may be carried out as illustrated and described in my application Serial No. 261,288, filed December 12, 1951, in order to improve the grain and texture of the dough. In this operation one of the sheeting rolls is rotated at a higher rate of speed than the other in order to provide a shearing action on one end of the dough strip to improve its grain and texture. The preferred pressure-rolling mechanism is illustrated and described in my application Serial No. 280,891, filed April 7, 1952, now issued as Patent No. 2,677,334 of May 4, 1954.

The preferred form of the invention having been thus described, what is claimed as new is:

1. A continuous method of moulding loaves of bread dough comprising continuously advancing a piece of bread dough in a unidirectional path while subjecting it to a plurality of sheeting operations to produce a flat elongated piece, bodily carrying the piece from one sheeting operation to the next while supported in a flat position and turning the piece in transit through an angle of approximately 90° to the line of advance, curling the sheeted piece after the second sheeting operation, bodily carrying the piece from the second sheeting operation to the curling operation, turning the piece through an angle of approximately 90° to the line of advance while being carried in transit from the second sheeting operation to the curling operation, and pressure rolling the curled pieces while it advances in the unidirectional line of movement.

2. The method defined in claim 1 wherein the interval of transit between the first and second sheeting operations and the second sheeting operation and the curling operation is sufficient for the sheeted dough to relax.

References Cited in the file of this patent

UNITED STATES PATENTS

| | | |
|---|---|---|
| 787,274 | Burns | Apr. 11, 1905 |
| 1,763,620 | Wolfarth et al. | June 10, 1930 |
| 2,373,012 | Burdett et al. | Apr. 3, 1945 |
| 2,479,864 | Rhodes | Aug. 23, 1949 |
| 2,534,734 | Rhodes | Dec. 19, 1950 |
| 2,604,057 | Rhodes | July 27, 1952 |
| 2,642,012 | Sticelber | June 16, 1953 |